(12) United States Patent
Halabisky et al.

(10) Patent No.: US 7,063,771 B2
(45) Date of Patent: *Jun. 20, 2006

(54) EMBOSSED INSULATING PAPERBOARD

(75) Inventors: Donald D. Halabisky, Tacoma, WA (US); William C. Johnston, Jr., Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/846,760

(22) Filed: May 14, 2004

(65) Prior Publication Data

US 2004/0213961 A1 Oct. 28, 2004

Related U.S. Application Data

(63) Continuation-in-part of application No. 10/407,568, filed on Apr. 4, 2003, now abandoned.

(51) Int. Cl.
*D21H 15/04* (2006.01)
*D21H 27/38* (2006.01)
*D21H 27/40* (2006.01)

(52) U.S. Cl. .................. 162/117; 162/129; 162/109; 162/157.1; 428/34.2; 428/537.5; 428/156; 156/219

(58) Field of Classification Search .......... 162/109, 162/117, 123, 125, 129–133, 100, 157.1, 162/141, 149, 146; 156/209, 219; 428/533–536, 428/537.5, 34.1–34.3, 156, 292.1
See application file for complete search history.

(56) References Cited

U.S. PATENT DOCUMENTS

| 4,913,773 | A | | 4/1990 | Knudsen et al. |
|---|---|---|---|---|
| 5,080,758 | A | * | 1/1992 | Horng ................. 162/130 |
| 5,683,339 | A | * | 11/1997 | Mills et al. ................ 493/58 |
| 5,840,787 | A | | 11/1998 | West et al. |
| 5,906,894 | A | * | 5/1999 | West et al. ................ 428/507 |
| 6,039,682 | A | * | 3/2000 | Dees et al. ................ 493/58 |
| 6,133,170 | A | | 10/2000 | Suenaga et al. |
| 6,186,394 | B1 | * | 2/2001 | Dees et al. ............ 229/122.34 |
| 6,224,954 | B1 | | 5/2001 | Mitchell et al. |
| 6,287,247 | B1 | * | 9/2001 | Dees et al. ................ 493/58 |
| 6,379,497 | B1 | | 4/2002 | Sandstrom et al. |
| 6,537,680 | B1 | | 3/2003 | Norlander et al. |
| 6,572,919 | B1 | * | 6/2003 | Westland et al. ........... 427/179 |
| 6,582,553 | B1 | * | 6/2003 | Jewell et al. ................ 162/9 |
| 6,630,054 | B1 | * | 10/2003 | Graef et al. ................ 162/101 |
| 6,919,111 | B1 | | 7/2005 | Swoboda et al. |
| 2002/0012759 | A1 | | 1/2002 | Asayama et al. |
| 2002/0031971 | A1 | * | 3/2002 | Westland et al. ........... 442/415 |
| 2003/0155088 | A1 | | 8/2003 | Norlander |
| 2004/0213930 | A1 | * | 10/2004 | Halabisky ................ 428/34.2 |
| 2004/0213961 | A1 | * | 10/2004 | Halabisky et al. .......... 428/156 |
| 2004/0213978 | A1 | * | 10/2004 | Halabisky ................ 428/292.1 |
| 2005/0112305 | A1 | | 5/2005 | Swoboda et al. |

FOREIGN PATENT DOCUMENTS

| CA | 1 251 718 | 8/1984 |
|---|---|---|
| FR | 2 550 993 | 3/1985 |
| WO | WO 90/13708 A1 | 11/1990 |
| WO | WO 01/54988 A2 | 8/2001 |

* cited by examiner

*Primary Examiner*—José A. Fortuna
(74) *Attorney, Agent, or Firm*—Christensen O'Connor Johnson Kindness PLLC

(57) ABSTRACT

An insulating paperboard contains at least one layer of cellulose fibers. The one layer is at least partially composed of bulky fibers. The paperboard is sufficiently insulated to provide a hot water ΔT across the paperboard of at least 0.7° C.±2.3° C. per 0.1 mm of caliper. The paperboard may be embossed to decrease surface transmission of heat. A hot cup may be produced from the insulating paperboard.

6 Claims, 1 Drawing Sheet

US 7,063,771 B2

EMBOSSED INSULATING PAPERBOARD

CROSS-REFERENCE TO RELATED APPLICATION

This application is a continuation-in-part of U.S. application Ser. No. 10/407,568, filed Apr. 4, 2003 now abandoned, priority from the filing date of which is hereby claimed under 35 U.S.C. § 120.

FIELD OF THE INVENTION

The present invention relates to an insulating paperboard, and more particularly to embossed paperboard containing bulky fibers.

BACKGROUND OF THE INVENTION

Hot foods, particularly hot liquids, are commonly served and consumed in disposable containers. These containers are made from a variety of materials including paperboard and foamed polymeric sheet material. One of the least expensive sources of paperboard material is cellulose fibers. Cellulose fibers are employed to produce excellent paperboards for the production of hot cups, paper plates, and other food and beverage containers. Conventional paperboard produced from cellulosic fibers, however, is relatively dense, and therefore, transmits heat more readily than, for example, foamed polymeric sheet material. Thus, hot liquids are typically served in double cups or in cups containing multiple plies of conventional paperboard.

It is desirable to possess an insulating paperboard produced from cellulosic material that has good insulating characteristics, that will allow the user to sense that food in the container is warm or hot and at the same time will allow the consumer of the food or beverage in the container to hold the container for a lengthy period of time without the sensation of excessive temperature. It is further desirable to provide an insulating paperboard that can be tailored to provide a variety of insulating characteristics so that the temperature drop across the paperboard can be adjusted for a particular end use.

SUMMARY OF THE INVENTION

The present invention provides an insulating paperboard that includes at least one layer of cellulose fibers formed into a paperboard layer. At least some of the cellulosic fibers in the layer are bulky fibers. Bulky fibers can be mechanically produced or can be produced by crosslinking the cellulosic fibers. The paperboard is embossed with a surface pattern to effectively reduce the surface area of the paperboard. Paperboard is sufficiently insulating to provide a hot water $\Delta T$ across the paperboard of at least 0.7° C.±2.3° C. per 0.1 mm of caliper.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
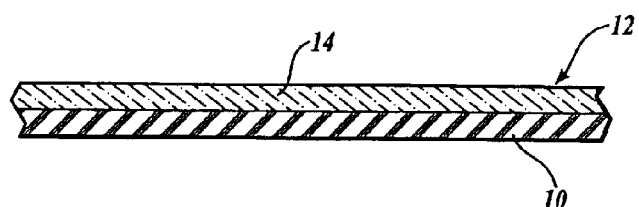
FIG. 1 is a schematic cross-sectional view of a two-ply paperboard constructed in accordance with the present invention.

Referring to FIG. 1, the substrate 10 for the insulating paperboard 12 of the present invention is produced in a conventional manner from readily available fibers such as cellulosic fibers. The paperboard of the present invention can be made in a single-ply, a two-ply construction, or a multi-ply construction, as desired. While the paperboard of the present invention may employ synthetic fibers as set forth above, it is most preferred that paperboard comprise all or substantially all of the cellulosic fibers.

The distinguishing characteristic of the present invention is that at least one ply 14 of the paperboard, whether a single-ply or a multiple-ply structure, contains bulky fibers. The bulky fibers increase the bulk density of the paperboard and thus the insulating characteristics. As used herein, bulky fibers are kinked, twisted, curly, cellulosic fibers. It is preferred, however, that the fibers be produced by intrafiber crosslinking of the cellulosic fibers as described in more detail below.

Paperboard of the present invention may have a broad set of characteristics. For example, its basis weight can range from 200 gsm to 500 gsm, more preferably, from 250 gsm to 400 gsm. Most preferably, the basis weight of the paperboard is equal to or greater than 250 gsm. To achieve the insulating characteristics of the present invention, it is preferred that the paperboard has a density of less than 0.5 g/cc, more preferably, from 0.3 g/cc to 0.45 g/cc, and most preferably, from 0.35 g/cc to 0.40 g/cc.

When at least one ply of the paperboard contains bulky fibers in accordance with the present invention, advantageous temperature drop characteristics can be achieved. These temperature drop characteristics can be achieved by altering the amount of bulky fiber introduced into the paperboard, by adjusting the basis weight of the paperboard, by adjusting the caliper of the paperboard after it has been produced by running it, for example, through nip rolls, and of course, by varying the number and thickness of additional plies incorporated in the paperboard structure. It is preferred that this paperboard have a caliper greater than or equal to 0.5 mm, a basis weight equal to or greater than 250 gsm, and a density less than 0.5 g/cc. In a most preferred form, the paperboard of the present invention exhibits a hot water $\Delta T$ of 10° C.±2.3° C. at a caliper of 0.64 mm and a hot water $\Delta T$ of 14° C.±2.3° C. at a caliper of 1.25 mm. The relationship of hot water $\Delta T$ to thickness is a linear one between the calipers of 0.6 mm and 1.25 mm and continues to be linear with a reduction in the caliper below 0.6 mm or an increase above 1.25 mm. Stated another way, a paperboard constructed in accordance with the present invention having a caliper of 0.3 mm or greater will exhibit a hot water $\Delta T$ (as defined below) of 0.7° C.±2.3° C. per 0.1 mm of caliper, and most preferably a hot water $\Delta T$ of 0.7° C.±2.0° C.

The paperboard of the invention can be a single-ply product. When a single-ply product is employed, the low density characteristics of the paperboard of the present invention allow the manufacture of a thicker paperboard at a reasonable basis weight. To achieve the same insulating characteristics with a normal paperboard, the normal paperboard thickness would have to be doubled relative to that of the present invention. Using the bulky fibers of the present invention, an insulating paperboard having the same basis weight as a normal paperboard can be made. This effectively allows the manufacture of insulating paperboard on existing paperboard machines with minor modifications and minor losses in productivity. Moreover, a one-ply paperboard has the advantage that the whole structure is at a low density. Furthermore, as will be described later, the low density paperboard of the present invention is easily embossable.

Alternatively, the paperboard of the invention can be multi-ply product, and include two, three, or more plies. Paperboard that includes more than a single-ply can be made by combining the plies either before or after drying. It is preferred, however, that a multi-ply paperboard be made by using multiple headboxes arranged sequentially in a wet-forming process, or by a baffled headbox having the capacity of receiving and then laying multiple pulp furnishes. The individual plies of a multi-ply product can be the same or different.

The paperboard of the present invention can be formed using conventional papermaking machines including, for example, Rotoformer, Fourdrinier, inclined wire Delta former, and twin-wire forming machines.

When a single-ply paperboard is used in accordance with the present invention, it is preferably homogeneous in composition. The single ply, however, may be stratified with respect to composition and have one stratum enriched with bulky fibers and another stratum enriched with non-bulky fibers. For example, one surface of the paperboard may be enriched with bulky fibers to enhance that surface's bulk and the other surface enriched with non-crosslinked fibers to provide a smooth, denser, less porous surface.

As stated, it is preferred and most economical to produce a paperboard that is homogeneous in composition. The bulky fibers are uniformly intermixed with the regular cellulosic fibers. For example, in the headbox furnish it is preferred that the bulky fibers present in the insulating ply or layer be present in an amount from about 25% to about 100%, and more preferably from about 30% to about 70%. In a two-ply structure, for example, the first ply may contain 100% non-bulky fibers while the second ply may contain from 25% to 100% bulky fibers and preferably from 30% to 70% bulky fibers. In a three-ply layer, for example, the bottom and top layers may comprise 100% of non-bulky fibers while the middle layer contains from about 25% to about 100% and preferably from about 30% to about 70% of bulky fibers.

When bulky fibers are used in paperboard in accordance with the present invention, it has been found that the paperboard exiting the papermaking machine can be compressed to varying degrees to adjust the temperature drop characteristics across the paperboard. In accordance with the present invention, the paperboard once leaving the papermaking machine may be compressed or reduced in caliper by up to 50%, and more preferably, from 15% to 25%. This adjustment in the caliper of the paperboard made in accordance with the present invention allows the hot water ΔT to be varied as desired. This same result can be achieved by lowering the basis weight of the paperboard.

In addition, the paperboard of the present invention can be embossed with a variety of conventional embossing rollers to produce a paperboard that has a tactile sense to the user quite different from that of the conventional paperboard. An embossed surface not only provides a better gripping surface, but also provides an actual and perceived reduction in the heat transfer from the surface of the paperboard to a person touching the exterior of the paperboard. Flat embossed cauls may also be used to form an embossed pattern on the paperboard. Any of a variety of embossed patterns can be employed. However, when the paperboard is to be employed as a single-ply layer for a hot cup, it is preferred that a fine pattern of indentations be embossed into the cup so as in essence to provide a multiplicity of small surface indents that effectively reduce the contact surface area for a person touching the surface of the paperboard. This is especially effective when the paperboard is used in a hot cup or other container that is held by a person for any period of time. The reduction in surface area reduces the amount of heat transferred to the person's fingers and thus reduces the sensation of excessive temperature. For example, the number of bumps and depressions in a one centimeter square surface of paperboard might comprise a 6 by 6 array.

Figure 2:
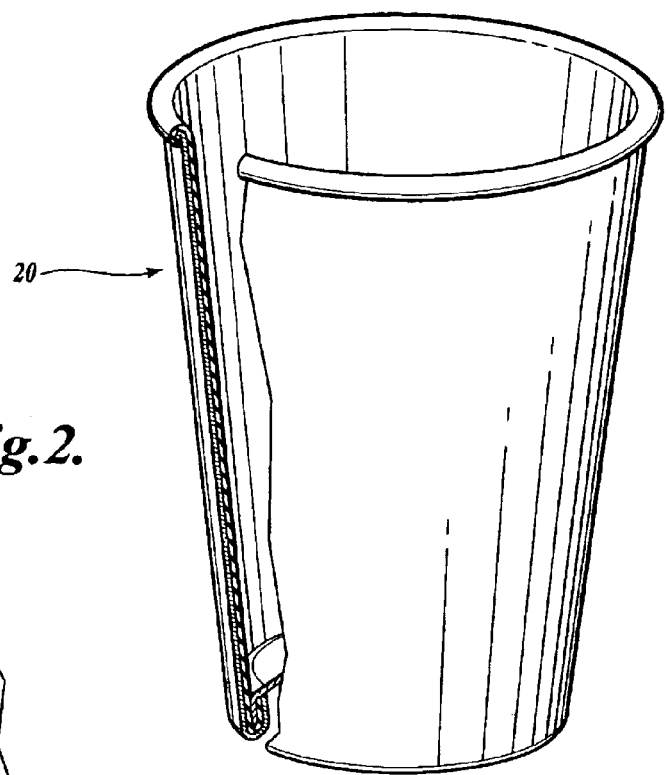
FIG. 2 is an isometric view of a hot cup made from the paperboard similar to that shown in FIG. 1 with a portion cut away.
Figure 3:
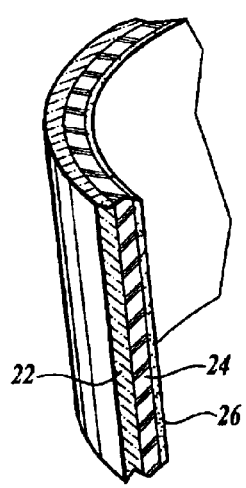
FIG. 3 is an enlarged cross-sectional view of a portion of the paperboard used to make the hot cup shown in FIG. 2.

The paperboard of the present invention can be utilized to make a variety of structures, particularly containers, in which it is desired to have insulating characteristics. Referring to FIG. 2, one of the most common of these containers is the ubiquitous hot cup utilized for hot beverages such as coffee, tea, and the like. Other insulating containers such as the ordinary paper plate can also incorporate the paperboard of the present invention. Also, carry-out containers conventionally produced of paperboard or of foam material can also employ the paperboard of the present invention. As shown in FIGS. 2 and 3, a hot cup type container produced in accordance with the present invention may comprise one or more plies 22 and 24, one of which, in this instance 24, contains bulky fibers. In this embodiment the bulky fibers are in the interior ply 24. A liquid impervious backing 26 is preferably laminated to the interior ply. The backing may comprise, for example, a variety of thermoplastic materials, such as polyethylene. It is preferred that the paperboard used in the bottom of the cup contain no bulky fibers.

Although available from other sources, nonbulky cellulosic fibers usable in the present invention are derived primarily from wood pulp. Suitable wood pulp fibers for use with the invention can be obtained from well-known chemical processes such as the kraft and sulfite processes, with or without subsequent bleaching. Pulp fibers can also be processed by thermomechanical, chemithermomechanical methods, or combinations thereof. The preferred pulp fiber is produced by chemical methods. Groundwood fibers, recycled or secondary wood pulp fibers, and bleached and unbleached wood pulp fibers can be used. Softwoods and hardwoods can be used. Details of the selection of wood pulp fibers are well known to those skilled in the art. These fibers are commercially available from a number of companies, including Weyerhaeuser Company, the assignee of the present invention. For example, suitable cellulose fibers produced from southern pine that are usable with the present invention are available from Weyerhaeuser Company under the designations CF416, NF405, PL416, FR516, and NB416.

In addition to fibrous materials, the paperboard of the invention may optionally include a binding agent. Suitable binding agents are soluble in, dispersible in, or form a suspension in water. Suitable binding agents include those agents commonly used in the paper industry to impart wet and dry tensile and tearing strength to such products. Suitable wet strength agents include cationic modified starch having nitrogen-containing groups (e.g., amino groups), such as those available from National Starch and Chemical Corp., Bridgewater, N.J.; latex; wet strength resins, such as polyamide-epichlorohydrin resin (e.g., KYMENE 557LX, Hercules, Inc., Wilmington, Del.), and polyacrylamide resin (see, e.g., U.S. Pat. No. 3,556,932 and also the commercially available polyacrylamide marketed by American Cyanamid Co., Stanford, Conn., under the trade name PAREZ 631 NC); urea formaldehyde and melamine formaldehyde resins; and polyethylenimine resins. A general discussion on wet strength resins utilized in the paper field, and generally applicable in the present invention, can be found in TAPPI monograph series No. 29, "Wet Strength in Paper and Paperboard", Technical Association of the Pulp and Paper Industry (New York, 1965).

Other suitable binding agents include starch, modified starch, polyvinyl alcohol, polyvinyl acetate, polyethylene/acrylic acid copolymer, acrylic acid polymers, polyacrylate, polyacrylamide, polyamine, guar gum, oxidized polyethylene, polyvinyl chloride, polyvinyl chloride/acrylic acid copolymers, acrylonitrile/butadiene/styrene copolymers, and polyacrylonitrile. Many of these will be formed into latex polymers for dispersion or suspension in water.

The preferred bulky fibers for use in the invention are crosslinked cellulosic fibers. Any one of a number of crosslinking agents and crosslinking catalysts, if necessary, can be used to provide the crosslinked fibers to be included in the layer. The following is a representative list of useful crosslinking agents and catalysts. Each of the patents noted below is expressly incorporated herein by reference in its entirety.

Suitable urea-based crosslinking agents include substituted ureas, such as methylolated ureas, methylolated cyclic ureas, methylolated lower alkyl cyclic ureas, methylolated dihydroxy cyclic ureas, dihydroxy cyclic ureas, and lower alkyl substituted cyclic ureas. Specific urea-based crosslinking agents include dimethyldihydroxy urea (DMDHU, 1,3-dimethyl-4,5-dihydroxy-2-imidazolidinone), dimethyloldihydroxyethylene urea (DMDHEU, 1,3-dihydroxymethyl-4,5-dihydroxy-2-imidazolidinone), dimethylol urea (DMU, bis[N-hydroxymethyl]urea), dihydroxyethylene urea (DHEU, 4,5-dihydroxy-2-imidazolidinone), dimethylolethylene urea (DMEU, 1,3-dihydroxymethyl-2-imidazolidinone), and dimethyldihydroxyethylene urea (DMeDHEU or DDI, 4,5-dihydroxy-1,3-dimethyl-2-imidazolidinone).

Suitable crosslinking agents include dialdehydes such as $C_2$–$C_8$ dialdehydes (e.g., glyoxal), $C_2$–$C_8$ dialdehyde acid analogs having at least one aldehyde group, and oligomers of these aldehyde and dialdehyde acid analogs, as described in U.S. Pat. Nos. 4,822,453; 4,888,093; 4,889,595; 4,889,596; 4,889,597; and 4,898,642. Other suitable dialdehyde crosslinking agents include those described in U.S. Pat. Nos. 4,853,086; 4,900,324; and 5,843,061. Other suitable crosslinking agents include aldehyde and urea-based formaldehyde addition products. See, for example, U.S. Pat. Nos. 3,224,926; 3,241,533; 3,932,209; 4,035,147; 3,756,913; 4,689,118; 4,822,453; 3,440,135; 4,935,022; 3,819,470; and 3,658,613. Suitable crosslinking agents may also include glyoxal adducts of ureas, for example, U.S. Pat. No. 4,968,774, and glyoxal/cyclic urea adducts as described in U.S. Pat. Nos. 4,285,690; 4,332,586; 4,396,391; 4,455,416; and 4,505,712.

Other suitable crosslinking agents include carboxylic acid crosslinking agents such as polycarboxylic acids. Polycarboxylic acid crosslinking agents (e.g., citric acid, propane tricarboxylic acid, and butane tetracarboxylic acid) and catalysts are described in U.S. Pat. Nos. 3,526,048; 4,820,307; 4,936,865; 4,975,209; and 5,221,285. The use of $C_2$–$C_9$ polycarboxylic acids that contain at least three carboxyl groups (e.g., citric acid and oxydisuccinic acid) as crosslinking agents is described in U.S. Pat. Nos. 5,137,537; 5,183,707; 5,190,563; 5,562,740; and 5,873,979.

Polymeric polycarboxylic acids are also suitable crosslinking agents. Suitable polymeric polycarboxylic acid crosslinking agents are described in U.S. Pat. Nos. 4,391,878; 4,420,368; 4,431,481; 5,049,235; 5,160,789; 5,442,899; 5,698,074; 5,496,476; 5,496,477; 5,728,771; 5,705,475; and 5,981,739. Polyacrylic acid and related copolymers as crosslinking agents are described U.S. Pat. Nos. 5,549,791 and 5,998,511. Polymaleic acid crosslinking agents are described in U.S. Pat. No. 5,998,511 and U.S. application Ser. No. 09/886,821.

Specific suitable polycarboxylic acid crosslinking agents include citric acid, tartaric acid, malic acid, succinic acid, glutaric acid, citraconic acid, itaconic acid, tartrate monosuccinic acid, maleic acid, polyacrylic acid, polymethacrylic acid, polymaleic acid, polymethylvinylether-co-maleate copolymer, polymethylvinylether-co-itaconate copolymer, copolymers of acrylic acid, and copolymers of maleic acid. Other suitable crosslinking agents are described in U.S. Pat. Nos. 5,225,047; 5,366,591; 5,556,976; and 5,536,369.

Suitable crosslinking catalysts can include acidic salts, such as ammonium chloride, ammonium sulfate, aluminum chloride, magnesium chloride, magnesium nitrate, and alkali metal salts of phosphorous-containing acids. In one embodiment, the crosslinking catalyst is sodium hypophosphite.

The crosslinking agent is applied to the cellulosic fibers as they are being produced in an amount sufficient to effect intrafiber crosslinking. The amount applied to the cellulosic fibers may be from about 1% to about 25% by weight based on the total weight of fibers. In one embodiment, crosslinking agent in an amount from about 4% to about 6% by weight based on the total weight of fibers. Mixtures or blends of crosslinking agents and catalysts can also be used.

EXAMPLES

A variety of test methods are utilized in the following examples. Hot water ΔT is determined in a simulated tester that models the heat transfer through a paper cup. A box of plexiglass measuring 12.1 cm by 12.1 cm by 12.1 cm has a sample opening of 8.9 cm by 8.9 cm. The box is insulated with 2.54 cm thick polystyrene foam. A sample of paperboard is laminated with a sheet of polyethylene using a hot air gun to adhere the polyethylene to the surface of the paperboard. Alternatively, the polyethylene may be extruded onto the surface of the board. Hot water at a temperature of 87.8° C. is poured into the box, a small stir bar inserted, and the polyethylene coated face of the sample is placed into the apparatus. The box is then turned 90° to the horizontal plane so that the water is in full contact with the sample and placed on a stir plate to permit stirring during the measurement phase. Five thermocouple microprobes are taped to the outside of the paperboard surface with conducting tape. A data logger records the temperature of the inside water temperature and the outside surface temperature from which the temperature drop (hot water ΔT) can be calculated. When the water temperature reaches 82.2° C., an infrared pyrometer with a 0.93 emissivity is aimed at the outside of the sample and the IR radiation measured. This IR gun is used to correlate the thermocouple accuracy.

Durometer tests were conducted in accordance with ASTM method D2240-91. This ASTM method is for rubber, cellular materials, elastomeric materials, thermoplastic materials, and hard plastics.

Example 1

A plurality of lab scale samples were produced on a pilot scale on a Delta Former, an inclined wire twinhead former. Both single-ply and two-ply samples were produced. The single-ply samples contained varying weight percentages of bulky fibers. In the two-ply samples, varying levels of bulky fiber were used in the base (bottom) layer. The nonbulky fiber was a cellulose softwood pine that was refined to 400 Canadian standard freeness (CSF). The bulky fiber employed was a fiber crosslinked with malic acid. The crosslinked cellulose fiber was crosslinked with a crosslinking agent. The pH of the system was adjusted to 8 with caustic. 20 g/kg of cooked cationic potato starch (Sta-Lok 400 available from Staley Manufacturing Company), 2 g/kg to 3 g/kg of AKD (alkyl ketene dimer) for water repellency, 5 g/kg to 7.5 g/kg Kymene, and 0 g/kg to 20 g/kg of uncooked cationic potato starch were added to the machine chest. See Table 1A below. Blends of crosslinked fiber and pine were lightly deflaked prior to board formation. The paperboard made was sized with an ethylated starch (Staley starch, Ethylx 2065) at the size press. Various samples were produced and are set forth in Table 1B below.

TABLE 1A

| Sample No. | AKD Level g/kg | Kymene Level g/kg | Uncooked Starch Level g/kg |
|---|---|---|---|
| 702P | 3 | 7.5 | 0 |
| 702R | 3 | 7.5 | 20 |
| 702S | 3 | 7.5 | 20 |
| 802D | 2 | 5 | 20 |
| 802E | 2 | 5 | 20 |
| 802G | 2 | 5 | 20 |
| 802H | 2 | 5 | 20 |
| 802I | 2 | 5 | 20 |
| 802J | 2 | 5 | 20 |

TABLE 1B

| Sample No. | Base Ply HBA % | Nominal Base Ply Weight g/m² | Top Ply C-Pine % | Nominal Top Ply Weight g/m² | Actual Board Weight g/m² | Actual Board Caliper mm | Actual Board Density g/cc |
|---|---|---|---|---|---|---|---|
| 702P | 50% | 350 | N/A | 0 | 379 | 1.20 | 0.32 |
| 702R | 50% | 350 | N/A | 0 | 427 | 1.22 | 0.35 |
| 702S | 50% | 275 | 100% | 75 | 396 | 1.03 | 0.38 |
| 802D | 60% | 450 | N/A | 0 | 439 | 1.22 | 0.361 |
| 802E | 60% | 350 | 100% | 75 | 437 | 1.16 | 0.378 |
| 802G | 50% | 325 | 100% | 75 | 405 | 0.95 | 0.427 |
| 802H | 50% | 275 | 100% | 75 | 313 | 0.73 | 0.428 |
| 802I | 40% | 325 | 100% | 75 | 412 | 0.90 | 0.457 |
| 802J | 40% | 325 | N/A | 0 | 436 | 0.99 | 0.439 |

Example 2

The insulating characteristics of each of the samples produced in accordance with Example 1 were measured using the hot water ΔT method described above. In addition, samples of the paperboards 702P, 702R, and 702S were pressed to varying calipers on a flat press. The caliper of the original boards as well as the pressed paperboards were measured along with their corresponding temperature drops. Those results are set forth in Table 2.

TABLE 2

| Experimental Board 0702H Sample | Pressure kg/cm² | Board Caliper (mm) | Hot Water ΔT° C. |
|---|---|---|---|
| 0702P | 0 | 1.21 | 14 |
| 0702P | 57 | 0.98 | 13 |
| 0702P | 85 | 0.92 | 13 |
| 0702P | 114 | 0.81 | 12 |
| 0702P | 171 | 0.73 | 12 |
| 0702R | 0 | 1.17 | 13 |
| 0702R | 57 | 0.77 | 11 |
| 0702R | 85 | 0.70 | 10 |
| 0702R | 114 | 0.67 | 11 |
| 0702R | 171 | 0.64 | 10 |
| 0702S | 0 | 1.06 | 14 |
| 0702S | 85 | 0.80 | 12 |
| 0702S | 114 | 0.77 | 11 |
| 0702S | 171 | 0.69 | 10 |
| 0802D | 0 | 1.22 | 25 |
| 0802E | 0 | 1.16 | 14 |
| 0802G | 0 | 0.95 | 11 |
| 0802H | 0 | 0.73 | 10 |
| 0802I | 0 | 0.90 | 9 |
| 0802J | 0 | 0.99 | 11 |

Example 3

Samples of paperboards 802E, 802G, and 802I were tested for hardness and embossability using the Durometer testing method set forth above. In addition, a standard hot cup paperboard sheet containing no bulky fiber was also tested. The results of the durometer testing are set forth in Table 3 below.

TABLE 3

| Board ID | % HBA | Durometer ID Type A: PTC Model 306L | Durometer ID Type D: Shore #62126 |
|---|---|---|---|
| 802E | 60% | 81 | 34 |
| 802G | 50% | 88 | 40 |
| 802I | 40% | 90 | 44 |
| Standard Paperboard | 0% | 96 | 60 |

The reduced hardness of the paperboard made in accordance with the present invention clearly indicates that the paperboard is more easily embossable than standard paperboard with no bulky fiber.

Example 4

Three samples of the paperboards 802E, 802G, and 802I were subjected to pressure in a press, and thereafter, the caliper was measured and the percent caliper change calculated. Each of the boards was compared with a standard hot cup paperboard containing no bulky fiber. The results are shown in Table 4.

TABLE 4

| | kg/cm² | | | | |
|---|---|---|---|---|---|
| Board ID | 0 | 90 | 226 | 316 | % HBA |
| | caliper, mm | | | | |
| 802E | 1.10 | 0.82 | 0.58 | 0.54 | 60% |
| 802G | 1.07 | 0.81 | 0.57 | 0.52 | 50% |
| 802I | 0.91 | 0.77 | 0.64 | 0.61 | 40% |
| Standard Board | 0.45 | 0.45 | 0.44 | 0.40 | 0% |
| | caliper change | | | | |
| 802E | 0% | 25% | 48% | 51% | 60% |
| 802G | 0% | 25% | 47% | 51% | 50% |
| 802I | 0% | 16% | 29% | 33% | 40% |
| Standard Board | 0% | 0% | 3% | 11% | 0% |

The compressibility, and thus embossability, of paperboard made in accordance with the present invention is clearly superior to that of standard paperboard.

The foregoing invention has been described in conjunction with a preferred embodiment and various alterations and variations thereof. One of ordinary skill will be able to substitute equivalents in the disclosed invention without departing from the broad concepts imparted herein. It is therefor intended that the present invention be limited only by the definition contained in the appended claims.

What is claimed is:

1. An embossed insulating paperboard comprising:
   at least one layer of cellulose fibers, at least some of the cellulose fibers in said at least one layer being crosslinked cellulosic fibers present in an amount from 25% to 100% of said at least one layer, said paperboard being sufficiently insulating to provide a hot water $\Delta T$ across said paperboard of at least 0.70° C.±2.30° C. per 0.1 mm of caliper, said paperboard having a density of less than 0.5 g/cc, and a basis weight of from 200 gsm to 500 gsm, said paperboard being embossed with a surface pattern to reduce the effective surface area of the paperboard, the caliper of said paperboard being greater than or equal to 0.5 mm.

2. The embossed paperboard of claim 1, wherein said paperboard has a basis weight of from 250 gsm to 400 gsm.

3. The embossed paperboard of claim 1, wherein said paperboard has a basis weight greater than or equal to 250 gsm.

4. The embossed paperboard of claim 1, wherein said paperboard has a hot water $\Delta T$ of 90° C.±2.3° C. at a caliper of 0.6 mm and a hot water $\Delta T$ of 14° C.±2.3° C. at a caliper of 1.25 mm, said hot water $\Delta T$ being a substantially linear progression relative to caliper in the temperature range from below 9° C. to above 14° C.

5. The embossed paperboard of claim 4, wherein said linear progression extends from a $\Delta T$ of 9° C. to a $\Delta T$ of 14° C.

6. The embossed paperboard of claim 1, wherein said paperboard is at least a two-ply board, said at least one ply containing said crosslinked cellulose fibers.

* * * * *

UNITED STATES PATENT AND TRADEMARK OFFICE
CERTIFICATE OF CORRECTION

PATENT NO. : 7,063,771 B2
APPLICATION NO. : 10/846760
DATED : June 20, 2006
INVENTOR(S) : Halabisky et al.

It is certified that error appears in the above-identified patent and that said Letters Patent is hereby corrected as shown below:

Col. 10, Line 26 should read as follows:

paperboard has a hot water $\Delta T$ of 9°C. ± 2.3°C at a caliper

Signed and Sealed this

Seventh Day of November, 2006

JON W. DUDAS
*Director of the United States Patent and Trademark Office*